United States Patent [19]
Oetiker

[11] 4,222,155
[45] Sep. 16, 1980

[54] HOSE CLAMP

[76] Inventor: Hans Oetiker, Oberdorfstrasse 21, Horgen, Switzerland

[21] Appl. No.: 956,503

[22] Filed: Nov. 1, 1978

[51] Int. Cl.$^2$ .............................................. B65D 63/02
[52] U.S. Cl. .................................. 24/20 R; 24/20 CW; 24/20 EE; 24/23 R; 285/407
[58] Field of Search .................. 24/23 R, 23 W, 23 B, 24/23 EE, 20 R, 20 EE, 20 CW, 20 LS, 20 S, 20 TT, 20 W, 19; 285/365, 252, 407

[56] References Cited

U.S. PATENT DOCUMENTS

| | | | |
|---|---|---|---|
| 1,804,725 | 5/1931 | Walker | 24/20 TT |
| 2,249,764 | 7/1941 | Hothersall | 24/20 EE |
| 2,614,304 | 10/1952 | Oetiker | 24/20 CW |
| 2,617,164 | 11/1952 | Daggett | 24/20 R |
| 2,640,524 | 6/1953 | Carpenter | 24/20 EE |
| 2,760,262 | 8/1956 | Homan | 24/20 W |
| 2,847,742 | 8/1958 | Oetiker | 24/19 |
| 3,067,640 | 12/1962 | Lodholm | 24/23 W |
| 3,082,498 | 3/1963 | Oetiker | 24/20 CW |
| 3,261,062 | 7/1966 | Scarborough, Jr. | 24/19 |
| 3,286,314 | 11/1966 | Oetiker | 24/20 CW |
| 3,303,669 | 2/1967 | Oetiker | 24/20 CW |
| 3,402,436 | 9/1968 | Oetiker | 24/20 CW |
| 3,475,793 | 11/1969 | Oetiker | 24/20 CW |
| 3,510,918 | 5/1970 | Oetiker | 24/19 |
| 3,602,533 | 8/1971 | Starr | 285/407 |
| 3,748,697 | 7/1973 | Marchese et al. | 24/19 |
| 3,754,303 | 8/1973 | Pollock | 24/23 W |
| 3,789,463 | 2/1974 | Oetiker | 24/20 CW |
| 3,981,049 | 9/1976 | Oetiker | 24/20 TT |
| 4,106,799 | 8/1978 | Oetiker | 24/20 R |

Primary Examiner—Victor N. Sakran
Attorney, Agent, or Firm—Craig & Antonelli

[57] ABSTRACT

A clamp structure which includes a clamping band with open ends adapted to be interconnected and with an ear for tightening the clamping band about an object to be fastened by plastic deformation of the ear; the free ends of the clamping band are provided with arched surface portions, as viewed in transverse cross section, to provide outwardly extending, groove-like reinforcing embossments, and at least one end of the band is of tapered configuration, as viewed in the circumferential direction thereof, with the tapering side surfaces converging toward each other in the direction toward the respective band end so that the arched surface portion of the one band end is able to engage in the overlying arched surface portion near the other band end to assure thereby a continuously smooth, stepless internal configuration of the band during tightening thereof by contraction of the ear as the diametric dimension is reduced.

34 Claims, 21 Drawing Figures

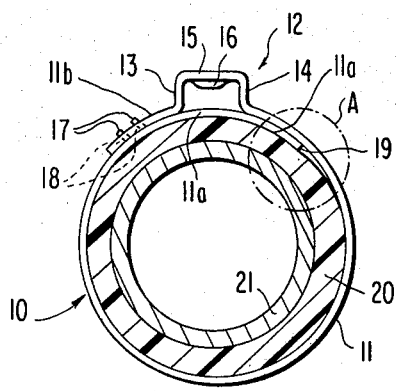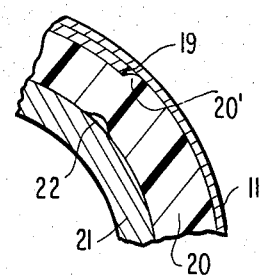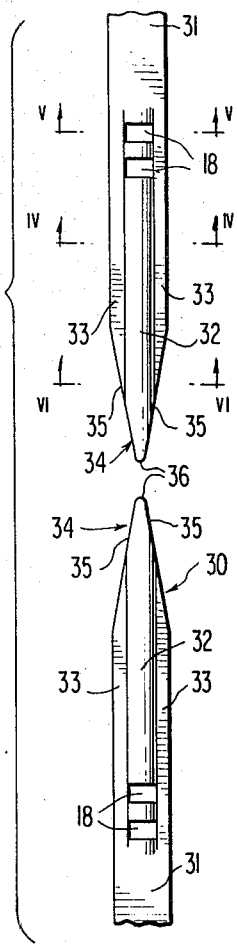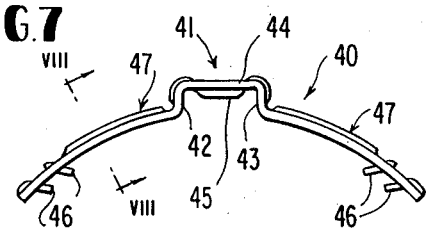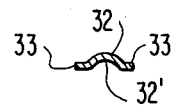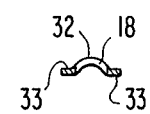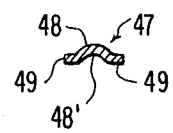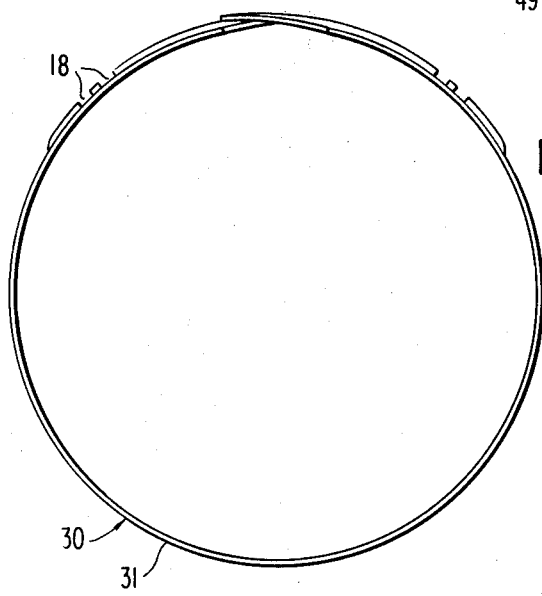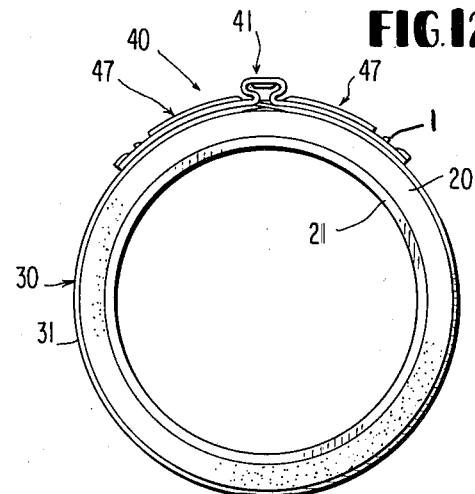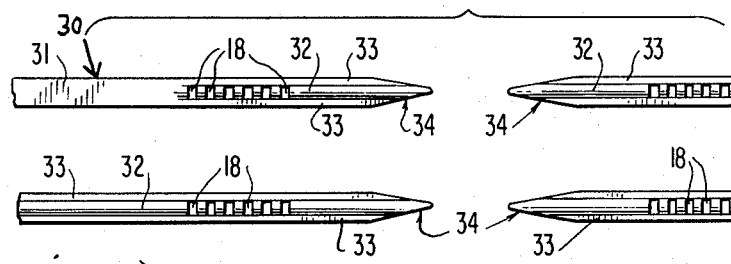

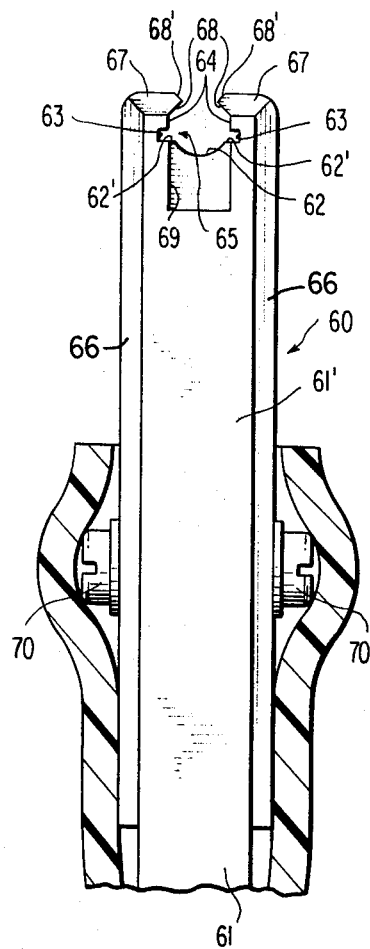
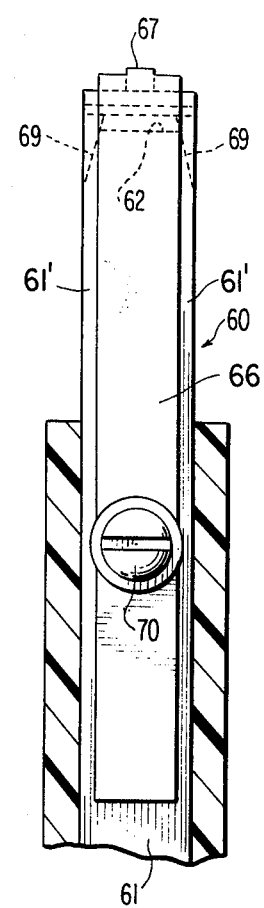
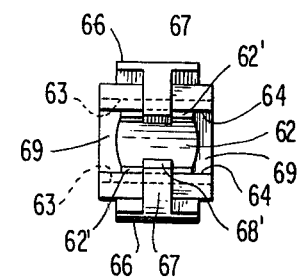
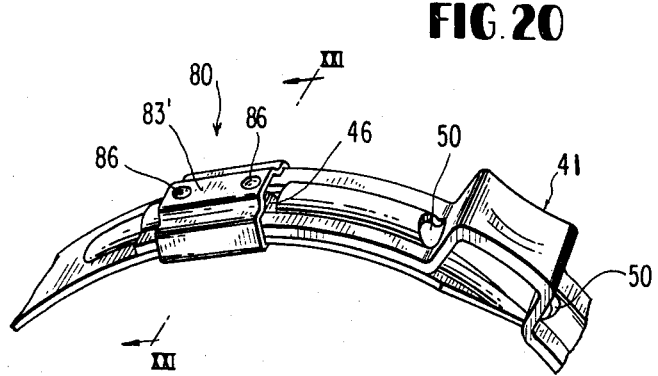
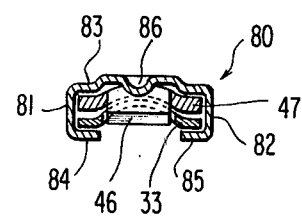

HOSE CLAMP

The present invention relates to a hose clamp, and more particularly to a hose clamp which will retain a perfectly smooth internal hose-engaging surface, devoid of any step or shoulder, during the tightening of the clamp.

Hose clamps with ears consisting of outwardly extending leg portions connected by a bridging portion and adapted to be deformed which are also referred to frequently as so-called "Oetiker" ears are known in the prior art either of one-ear construction or of two or more ear construction (U.S. Pat. No. 2,614,304; U.S. Pat. No. 3,082,498; and U.S. Pat. No. 3,402,436). While these prior art clamps with so-called "Oetiker" ears proved extremely successful, they posed from time to time certain problems in particular applications by reason of the fact that hose material might be squeezed or displaced into the narrow gap underneath an ear, thereby representing potential leakage places. To avoid this shortcoming, various proposals were made in the prior art to cover the gap, for example, in connection with a one ear clamp by extending one band end to a point beyond the opposite side of the ear to thereby cover the gap underneath the ear (FIG. 5 of U.S. Pat. No. 3,286,314; German Gebrauchsmuster No. 1,851,827; U.S. Pat. No. 3,321,811). However, these prior art proposals still left unsolved in certain applications the problem of a potential leakage place since the end face of the overlapping inner band end formed with its end face a step or offset corresponding in its dimension to the thickness of the inner overlapping band end that again represented an undesired discontinuity in the smooth internal configuration of the clamping band and therewith a potential leakage place. The attempt to solve this problem by grinding the inner overlapping band end so as to taper in thickness by conically decreasing the thickness of the band material toward the free end not only proved extremely costly and thus impractical but also failed to provide a real solution to this problem. As an alternative solution to the problem, insert rings (U.S. Pat. No. 3,303,669) or bridging members (U.S. Pat. No. 3,789,463) of relatively thin material were proposed heretofore. Though a relatively thin band material can be used for the insert ring or the bridging member which minimizes the size of the step or offset formed thereby, these insert rings or bridging members can also be utilized only limitedly since step-like transitions or offsets are still present. With the availability of new plastic hose materials of greater hardness, for example, of the order of 90 Shore hardness, these problems assumed ever greater significance and the need for a continuously smooth internal configuration, devoid of any step or offset, during the tightening operation causing a reduction in the diametric dimension of the clamp became evermore important. This is true when utilizing this type of hose clamp in applications involving, for example, the tightening of plastic fuel hoses carrying the fuel for internal combustion engines of motor vehicles onto connecting nipples or other fixed parts. In those and similar applications, a complete tightness under all operating conditions during the life of the hose is an absolute necessity to avoid accidents and serious injuries due to a possible leakage in the fuel line.

The present invention is therefore concerned with the task to provide a special hose clamp which avoids by simple means the aforementioned shortcomings and drawbacks encountered in the prior art and which provides an internal hose-engaging surface in the clamping band which is continuously smooth over its entire 360° circumference, i.e., which is devoid of any steps, shoulders or offsets and which offers the appearance and effect of an endless configuration.

The underlying problems are solved according to the present invention with a clamp structure utilizing a so-called "Oetiker" ear in that the open clamping band is provided at least at the free ends thereof with an arched surface portion, as viewed in transverse cross section through the band, to provide outwardly extending, convexly shaped, groove-like reinforcing embossments within the area of the band ends, and in that at least one band end is of tapered configuration, as viewed in the circumferential direction thereof, with the tapering side surfaces converging toward each other in the direction toward the respective band end so that the tapered, arched surface portion of one band end is able to engage in the overlying arched surface portion near the other band end to assure thereby a continuously smooth stepless internal configuration of the band during tightening of the clamp structure by contraction of the ear. The arched surface portions are thereby preferably located substantially centrally in the band, as viewed in transverse cross section of the band, and are adjoined on each side thereof by relatively flat object-engaging band surfaces.

In one particularly advantageous construction of the present invention, each end of the band is tapered in the circumferential direction and is provided with an arched surface portion extending at least over a predetermined distance in the circumferential direction from the respective free band end. Preferably the tapering side surfaces of a respective band end do not converge to a point of intersection but terminate in front of such point of intersection by passing over into a rounded-off free end whereby the width of this rounded-off end at the point of transition from the converging side surfaces is at most the width of the arched surface portion as viewed in the transverse cross section but is preferably only about $\frac{1}{3}$ to about $\frac{2}{3}$ the width of the arched surface portion. In other words, the tapering side surfaces extend at such an angle to the circumferential direction and over such a distance that at the point of transition, no flat object-engaging surfaces of the band exist any longer. In a particularly appropriate construction of the present invention, the tapering side surfaces are rectilinear and the width of the remaining arched surface portion at the point of transition is about one-third to two-thirds the width of the arched surface portion, as viewed in the transverse cross section of the band.

The free ends of the clamp structure are connected with each other by the use of form-locking connecting means which preferably include at each place of the form-locking connection several inwardly extending hooks punched out of the arched surface portion of an outer band portion and engaging in openings provided in the arched surface portion of the underlying band portion, whereby the arched surface portion extends from its free band end to a point beyond the last such opening.

In a preferred embodiment of the present invention, the ear for contracting the clamp is provided in a separate clamping or bridge member that includes on both sides of the ear, circumferentially extending band portions each provided with inwardly extending hook engaging in corresponding openings provided in arched surface portions near each end of the clamping band so that the clamp structure is assembled and completed by engagement of the hooks in respective openings and can then be tightened about the object to be fastened by contraction of the ear. In this preferred embodiment, each end of the clamping band is tapered in the circumferential direction and is provided with a centrally disposed arched surface portion extending from the tapered end a predetermined distance in the direction toward the center of the band to a point near and preferably beyond the last opening in this band end. The remaining band part of the clamping band may be relatively flat, i.e., devoid of an arched surface portion. This arrangement permits ease of installation since only those parts of the band provided with arched surface portions which cause a reinforcement and therewith stiffening against bending are preferably pre-bent to approximately the radius of curvature of the object with which they are to be used, while the remaining clamping band portion is relatively flat and can thus be more readily bent from its rectilinear configuration into a curved configuration having any desired radius of curvature.

However, according to another embodiment of the present invention, the clamping band may be provided with a centrally arched surface portion over its entire length. Moreover, while the number of openings in a respective band end may correspond exactly to the number of hooks engaging into the openings, the number of openings may also be greater than the number of hooks so that the clamp structure can be utilized for more than one size of diameter.

In another embodiment of the present invention, the ear is formed unitary, i.e., in one piece with the clamping band and is located a predetermined distance from one band end, whereby this one band end is provided with the hooks near the one band end while openings are provided in the underlying band portion which extends over the gap underneath the ear and engages with the tapering arched surface portion of the other band end into a corresponding centrally disposed arched surface portion provided in the overlying band portion. The tapering band end provided with the openings is thereby provided with an arched surface portion extending from the free end thereof to at least the last opening while a similar arched surface portion is provided at least in the band portions extending in the circumferential direction from both sides of the ear, and more particularly a distance toward the center of the band sufficient to accommodate the underlying tapering band end.

In any of the various possible constructions described herein, the ear itself may be of flat band material or of a band material having a similar centrally disposed arched surface extending also over the outwardly extending leg portions and interconnecting bridging portion of the ear which is preferably also provided with a circumferential reinforcing groove in the bridging portion thereof. In case the ear is made of a material with centrally disposed arched surfaces, causing a certain stiffening of the ear against contraction thereof, openings are preferably provided in the arched surface portions in the transitional areas from the circumferential band portions into the leg portions to facilitate contraction of the ear.

In case of a two-partite construction, in which a separate clamping or bridge member with a so-called "Oetiker" ear is provided, an auxiliary holding means may be advantageous for holding one end of the clamping or bridge member assembled with one end of the band while the other end of the clamping member is form-lockingly connected with the other end of the band. The auxiliary holding means may be in the form of a small holding clamp which is of a generally rectangular configuration, as viewed in transverse cross section, and consists of two side portions connected by an outer bridging portion having a centrally arched surface portion and inwardly disposed relatively short leg portions extending at approximately right angle toward each other from the side portions. The length of the relatively short leg portions is preferably at most equal to the flat, object-engaging side surfaces of the clamping band, while the side portions of the holding clamp have a length slightly greater than the thickness of a tapering end portion of the clamping band plus the thickness of a band portion of the clamping or bridge member. The holding clamp may also be provided in its outer bridging portion with two point-like indexing indentations to hold it in proper place in relation to the openings formed in the respective circumferential band portion of the clamping or bridge member by the punched-out inwardly extending hooks.

In the alternative, the auxiliary holding means may be a tool which is so constructed and arranged that it will hold the clamping or bridging member engaged with its hooks in the openings of one band end and to retain these parts in the thus preassembled condition while the hooks of the other end of the clamping or bridge member are engaged into corresponding openings of the other band end. The tool which comprises a handle part and a clamp-engaging part of rectangular configuration is thereby provided with a rectangularly shaped channel open along the outer surface of the clamp-engaging part and forming inwardly thereof a band-engaging surface of a width slightly greater than the width of the clamping band and provided with a centrally disposed recess portion of a shape at least approximately complementary to an arched surface portion. The outer ends of the flat band-engaging surface portions which adjoin the centrally disposed recess portion are formed by approximately concical undercuts in the channel to facilitate insertion of the clamp. Two flexible holding members which extend over a substantial length of the clamp-engaging part along the outer sides thereof disposed parallel to the direction of the channel are secured at their inner ends to the clamp-engaging part so that the two leg portions extending toward each other at right angle from the holding members over the outer end of the tool can be spread apart elastically.

Accordingly, it is an object of the present invention to provide a clamp structure which avoids by simple means the aforementioned shortcomings and drawbacks encountered in the prior art.

Another object of the present invention resides in a clamp structure which, during tightening thereof, provides a continuous smooth inner configuration, devoid of step or offset, to thereby avoid potential leakage places.

A further object of the present invention resides in a clamp structure of the type described above which can be manufactured in a relatively simple and inexpensive manner, yet achieves all of the aforementioned aims and objects in a completely satisfactory manner.

A still further object of the present invention resides in a clamp structure which can be easily installed by being placed around the object to be fastened, even in relatively tight places.

Still another object of the present invention resides in a clamp structure which by simple means assures a completely tight fastening of a hose onto a connecting member, capable of withstanding relatively high pressures and vibrations without the danger of becoming loose or developing leakage places.

These and other objects, features and advantages of the present invention will become more apparent from the following description when taken in connection with the accompanying drawing which shows for purposes of illustration only, several embodiments in accordance with the present invention and wherein:

FIG. 1 is a cross-sectional view illustrating a prior art hose clamp for mounting a hose over a connecting member with the ear in the uncontracted condition thereof;

FIG. 2 is a partial cross-sectional view, on an enlarged scale, illustrating certain details of the prior art clamp of FIG. 1 in operation;

FIG. 3 is a plan view on the two ends of a clamping band for a clamp structure in accordance with the present invention;

FIG. 4 is a cross-sectional view taken along line IV—IV of FIG. 3;

FIG. 5 is a cross-sectional view taken along line V—V of FIG. 3;

FIG. 6 is a cross-sectional view taken along line VI—VI of FIG. 3;

FIG. 7 is a side elevational view of a bridge member for use with the clamping band of FIG. 3;

FIG. 8 is a cross-sectional view taken along line VIII—VIII of FIG. 7;

FIG. 9 is a plan view on the two ends of a modified embodiment of a clamping band for a clamp structure in accordance with the present invention, which enables use thereof for different-sized objects;

FIG. 10 is a plan view on the two ends of a still further modified embodiment of a clamping band provided with arched surface portion extending over the entire length thereof for a clamp structure in accordance with the present invention;

FIG. 11 is a side elevational view, taken in the axial direction, showing the arrangement of the overlapping ends of the clamping band of FIG. 3, when about to be placed over an object to be fastened;

FIG. 12 is a side elevational view, taken in the axial direction, showing an installed clamp structure in accordance with the present invention utilizing a clamping band of FIG. 3 and a bridge member of FIG. 7;

FIG. 17 is an elevational view of a holding tool for assisting in the assembly of a clamp structure of the type shown in FIG. 12;

FIG. 18 is a side elevational view of the auxiliary tool taken at right angle to FIG. 17;

FIG. 19 is a plan view on the tool of FIG. 18;

FIG. 20 is a perspective view of a holding clamp member in accordance with the present invention for preassembling the clamp structure of the type shown in FIG. 12; and FIG. 21 is a cross-sectional view taken along line XXI—XXI of FIG. 20.

Figure 13:
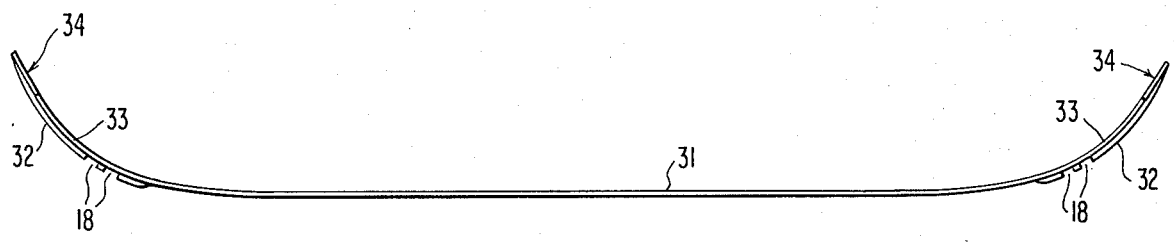
FIG. 13 is a side elevational view of a preferred embodiment of a clamping band of the type illustrated in FIG. 3 with only the ends thereof pre-bent to the approximate radius of curvature of the object with which it is to be used.

Referring now to the drawing wherein like reference numerals are used throughout the various views to designate like parts, and more particularly to FIGS. 1 and 2, these two figures illustrate a prior art band clamp generally designated by reference numeral 10, mounted over a hose 20 to be fastened onto a nipple or other connecting member 21. The prior art band clamp 10 includes an open, flat band 11 having an inner band end 11a and an outer band end 11b. An ear generally designated by reference numeral 12, which is a typical so-called "Oetiker" ear, includes leg portions 13 and 14 interconnected by a bridging portion 15 which is provided with a reinforcing groove 16 extending generally in the circumferential direction. Hooks in which are provided on the inner band end 11a a predetermined distance from the free end thereof, extend outwardly and engage in openings 18 provided in the outer band end 11b in corresponding places. The inner band end 11a thereby extends underneath the gap in the ear 12 a predetermined distance therebeyond. As a result of the overlap of the inner band end 11a and of the outer band end 11b, a step or offset 19 is formed which represents a discontinuity in the smooth inner configuration of the hose-engaging surface of the band 11. As shown on an enlarged scale in FIG. 2, in actual use the step 19 may cause the hose 20 to be squeezed or displaced outwardly, i.e., away from the nipple 21 thereby forming a potential leakage place 22.

In order to prevent any potential leakage places due to such steps or discontinuities in the otherwise smooth inner configuration of the hose-engaging surface of the clamp, the present invention comprises a clamping band generally designated by reference numeral 30 (FIGS. 3, 11 and 12) which is provided near its free ends with a substantially centrally disposed, circumferentially extending arched surface portion 32 defining a convexly shaped outwardly extending groove-like reinforcing embossment forming a recess 32' adjoined on each side thereof by a flat, object-engaging band surface 33, as viewed in transverse cross section (FIG. 4). The tapering end portions generally designated by reference numeral 34 of each band end (FIG. 3) include substantially rectilinear side surfaces 35 converging toward one another in the circumferential direction and passing over into a rounded-off free end 36 whereby the width of the band at the point of transition from the side surfaces 35 into the rounded-off free end 36 is less than the width of the arched surface portion 32, and preferably is between one-third to two-thirds the width thereof. Of course, it is also possible to permit the side surfaces 35 to intersect in a point and/or to utilize side surfaces 35 which are not exactly rectilinear.

A form-locking connection in the form of a clamping or bridge member generally designated by reference numeral 40 (FIG. 7) is used to interconnect the free ends of the band 30. The bridge member 40 includes a so-called "Oetiker"-type ear generally designated by reference numeral 41 consisting of generally outwardly extending leg portions 42 and 43 interconnected by a bridging portion 44 which is provided with a reinforcing groove 45 extending generally in the circumferential direction. Inwardly extending hooks 46 are punched out of the arched surface portions 48 provided in the circumferentially extending band portions generally designated by reference numeral 47 of the bridge member 40. The hooks 46 thereby extend at an angle of about 30° to 60°, preferably about 45°, to the band portion 47 in the direction inwardly obliquely away from the respective end of the band portion 47. The circumferential band portions 47 are also provided preferably over their entire length with centrally disposed outwardly extending arched surface portions 48 forming reinforcing embossments with recesses 48' inwardly thereof. The arched surface portion 48 is again adjoined on each side thereof by a flat object-engaging surface portion 49 (FIG. 8). The hooks 46 are adapted to engage in openings 18 (FIG. 3) provided near each end of the band 30. The number of such openings 18 may correspond to the number of hooks (FIG. 3) or may be greater than the number of hooks (FIGS. 9 and 10) to thereby permit use of the band for objects of different diameters.

FIG. 12 illustrates a clamp structure utilizing the clamping band 30 of FIG. 3 and the bridge member 40 of FIG. 7 in the installed condition, in which the hose 20 is fastened onto a connecting member 22 by the tightened clamp structure after the ear 41 thereof has been contracted in the usual manner.

Figure 14:
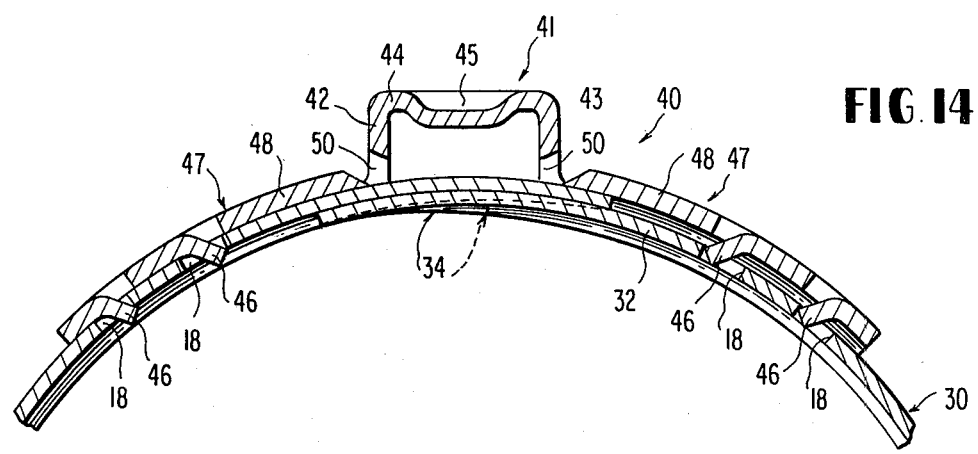
FIG. 14 is a partial cross-sectional view, on an enlarged scale, showing the arrangement of the clamping band of FIG. 3 and of the bridge member of FIG. 7 when assembled over an object to be fastened but prior to the contraction of the ear.
Figure 15:
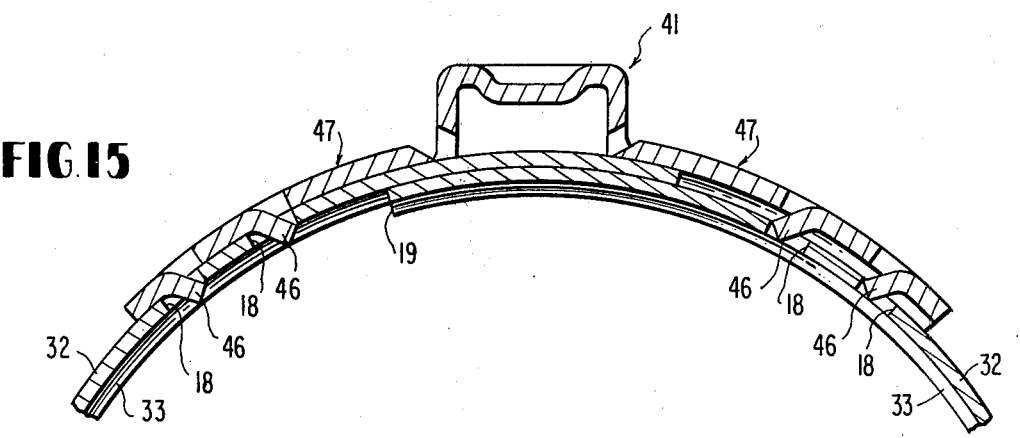
FIG. 15 is a partial cross-sectional view, similar to FIG. 14, showing the formation of a step in the absence of the tapering configuration at the free ends of the band.

FIG. 14 illustrates on an enlarged scale, how tapering ends 34 of the clamping band 30 with their arched surface portions 32 are able to assure a continuous smooth internal object-engaging surface, when the ear is contracted to tighten the clamp by reducing its diametric dimension. As can be seen from FIG. 14, no step or discontinuity exists in the internal object-engaging surface of the clamp structure, as contrasted to the arrangement in FIG. 15, in which a step 19 is again formed even if the parts are provided with arched surfaces in the band ends which, however, are not tapered.

FIG. 9 illustrates a clamping band 31 similar to the one illustrated in FIG. 3 but provided with several openings 18 to utilize the clamp for differently sized objects.

FIG. 10 illustrates a modified embodiment in which the arched surface 32 extends over the entire length of the band. This embodiment is particularly suitable for relatively hard plastic hoses since the surface of the band which actually engages with the plastic hose is reduced by the arched surface, so that the specific clamping pressure is increased. Moreover, the hose material can no longer escape since it is squeezed into the arched surface portion of the clamping band where it is held against lateral escape.

FIG. 13 illustrates a particularly appropriate embodiment of a clamping band of the type illustrated in FIG. 3 which has its band ends pre-curved to the approximate radius of curvature of the object for which it is to be used since the groove-like arched reinforcing surfaces 32 will make it more difficult to bend the clamping band to the desired radius of curvature. On the other hand, the rectilinear flat band portion 31 can be easily bent to the desired radius of curvature at the place of actual use, for example, it can be easily placed and bent about an axle sleeve boot to the desired configuration whereupon the assembly of the clamp can be completed.

Figure 16:
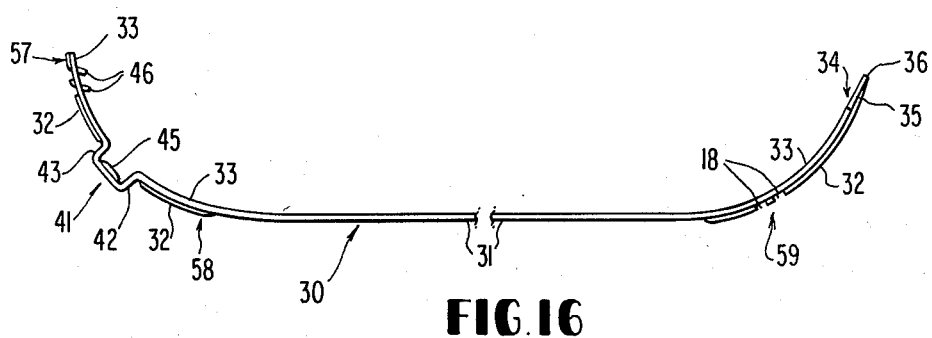
FIG. 16 is a side elevational view similar to FIG. 13 of a modified embodiment of a clamp structure in accordance with the present invention in which the ear is in one piece with the clamping band.

FIG. 16 illustrates a modified embodiment in accordance with the present invention in which the so-called "Oetiker" ear 41 is formed in one piece with the clamping band 30. The clamping band 30 again includes a flat band portion 31 as well as band ends provided with groove-like reinforcements formed by centrally disposed arched surface portions 32. At least the end 34 of the band provided with the openings 18, i.e., the one without the hooks 46, should be tapered, as indicated at 35, in a manner similar to the corresponding band end shown in FIG. 3. As to the rest, the clamp of FIG. 16 is used in the same manner as the clamp of FIGS. 3 and 7, except that hooks 46 are provided only in the band end adjoining the ear 41, which, for assembly purposes, are engaged in openings 18 provided near the tapering band end 34. As can be seen from FIG. 16, the clamping band portion extending from ear 41 to the nearest band end, the clamping band portion extending from ear 41 toward the center of the band and the clamping band portion at the band end 34 are each provided with outwardly extending groove-like reinforcements generally designated by reference numerals 57, 58 and 59, respectively, and formed by the centrally disposed corresponding arched surface portions 32.

To facilitate the assembly of the clamping or bridge member 40 (FIG. 7) onto the clamping band 30 (FIGS. 3, 9 and 10), an auxiliary tool as shown in FIGS. 17 through 19 or an auxiliary holding clamp as shown in FIGS. 20 and 21 may be used. The tool generally designated by reference numeral 60 of FIGS. 17, 18 and 19 includes a handle portion 61 which may be, for example, of circular configuration and a clamp-engaging portion 61' of, for example, rectangular configuration. A rectangularly shaped channel 64 is thereby cut into the clamp-engaging portion from the outer surface thereof so that the channel 64 is open at the outer end of the tool. The inner end of the channel 64 forms a band-engaging surface generally designated by reference numeral 65 which consists of a centrally disposed recess portion 62 of a shape at least approximately complementary to the arched surface portions 48 or 32 which is adjoined on each side thereof by a flat surface portion 62'. The latter are extended into the sides of the channel 64 by undercuts 63 so that the total width of the band-engaging surface 65 is slightly greater than the width of the band. Two flexible holding members 66 are secured along the sides of the rectangular handle portion 61' which are parallel to the direction of the channel 64. The holding members 66 are provided with leg portions 67 extending at right angle to the holding members 66 over the outer end of the tool and projecting into the center area of the rectangular channel 64. The holding members 66 are thereby fastened by means of screws 70 or the like near their inner ends so that, as a result of the length of the holding members 66 and the thickness of the material, the leg portions 67 can be elastically spread apart. As can be seen from FIG. 17, the leg portions 67 are preferably provided with double bevelled surfaces 68' while bevelled surfaces 69 lead from the outer surface of the rectangular tool part to the band-engaging surface 65. Any suitable cutting tool may be used to provide the undercuts 63 which may be, for example, of conical configuration in cross section.

In actual use, the hooks 46 at one end of the bridge member 40 are inserted into the corresponding openings 18 of the respective band end. The parts thus partly pre-assembled are held in place while the tool 60 is slipped over the thus-pre-assembled parts in such a manner that the band portion 47 engages with its arched surface portion 48 in the recess 62 while the engaging surfaces 49 (FIG. 8) are maneuvered into engagement with the side surface 62'. The leg portions 67 which will return to their closed position, will thus retain the band portion 47 as well as the band end with its arched surface portion 32 in the rectangular channel 64 until the hooks 46 of the other side can be engaged with corresponding openings 18 in the other band end. The tool 60 can then be removed from the thus assembled clamp structure, prior to the contraction of the ear, by merely canting the tool relative to the clamp structure so that one side of the band end and corresponding band portion of the bridge member will ride up along the bevelled surface 68 to cause the corresponding holding member 66 to elastically yield. The double bevelled configuration 68, 68' is provided to facilitate both engagement and disengagement of the tool.

The holding clamp generally designated by reference numeral 80 illustrated in FIGS. 20 and 21 includes two side portions 81 and 82 connected by an outer bridging portion 83. Two relatively short legs 84 and 85 extend at right angle from the side portions 81 and 82 toward one another. The outer bridging portion 83 is thereby of complementary arched configuration as indicated by the arched surface portion 83'. The length of the leg portions 84 and 85 is at most equal, but preferably slightly less than the flat object-engaging surfaces 33 of the clamping band. On the other hand, the side portions 81 and 82 have a length slightly greater than the thickness of an end portion of the clamping band 30 plus the thickness of a band portion 47 of the bridge member 40. The interconnecting bridging member 83 is additionally provided with two point-like indentations 86 which act as indexing means to hold the holding clamp 80 in proper position relative to the openings formed in the band portion 47 by the punched-out hooks 46. The use of the holding clamp 80 is believed apparent from FIGS. 20 and 21. It is merely slipped over one end of the clamping band 30, the bridge member 40 is then engaged with its hooks 46 in corresponding openings 18 of this band end and the holding clamp 80 is then slid back over the thus preassembled parts until its indentations 86 register with the openings formed by the punched-out hooks 46. The holding clamp 80 may stay in place after the clamp is tightened or may be removed prior to the contraction of the ear by suitable means. If the leg portions 84 and 85 of the holding clamp are made sufficiently short, it can be readily left in place even when the clamp is installed and tightened since the danger of leakage is minimized under those conditions, particularly if the hose material is relatively softer. Moreover, the holding clamp 80 may be slid back over the preassembled parts until the indentation 86 nearest the ear 41 engages in the opening 50.

While only one-ear clamps have been described so far, it is of course understood that the present invention is also applicable to two or more ear clamps in that it is only necessary to utilize a number of bridging members and clamping bands corresponding to the number of ears desired. For example, a two-ear clamp can also be readily made by the use of two clamping bands of the type illustrated in FIGS. 3, 9 or 10 interconnected by two clamping or bridge members 40. Moreover, the thickness of the clamping band may be the same or different from the thickness of the bridge member 40. Furthermore, the material from which the ear 41 is made may be relatively flat material or may be of a material provided with a similar arched surface configuration as the adjoining band portions. In the latter case, it is desirable to provide openings 50 (FIG. 14) within the area of the transition from the leg portions 42 and 43 into the adjoining band portions. In summary, the present invention provides a clamp structure in which a stepless transition is achieved between the open ends thereof which permits a stepless reduction of the diametric dimension of the clamp during the closing of the ear which assures a tight clamping action especially in connection with relatively hard plastic hoses. Moreover, the arched surface configuration of the clamp offers the advantage compared to a flat band material that especially in connection with relatively hard hoses, the abutment surface for the hose is formed by relatively narrow object-engaging surfaces on both sides of the arched surface portion which presses the hose material against the connecting member and thus linear abutment surfaces about the entire circumference of the hose. In contrast to a flat band, the hose material is held fast in the arched surface portion so that a lateral escape of the hose on both sides of the clamp is no longer possible even when subjected to strong vibrations or as a result of aging of the hose material. Finally, the arched surface portion additionally offers the advantage that the inwardly extending hooks engaging in openings provided in the underlying band portion do not damage the hose since the hooks are present in the arched surface portion. If any contact takes place between the hooks and the hose material, such contact takes place only during the very last phase of the tightening operation, i.e., a scratching of the hose surface during the tightening operation by the inwardly extending hooks is no longer possible with the use of a clamp structure according to the present invention.

The arched surface configuration may be obtained by any suitable means. It can be realized in a simple manner by the use of pincers when using a band material as shown in my prior U.S. Pat. No. 2,847,742 by merely placing the jaws of the pincers in the center of the band. Moreover, even if no band material as shown in my prior U.S. Pat. No. 2,847,742 is available, openings may be punched or cut into flat band material by suitable means and thereafter the arched surface configuration may be realized in the manner described hereinabove. The tapered configuration may also be obtained by the use of a simple cutting tool. Of course, for mass production, the clamping bands and clamping or bridge members may be manufactured utilizing suitable automatic tools.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clamp structure for objects to be fastened by radially directed clamping forces, comprising clamping band means having open ends and operable to exert radially directed forces on an underlying object to be fastened, means connecting the open ends with each other, and ear means in the clamp structure for tightening the clamping band means about the object to be fastened by plastic deformation of said ear means, characterized in that at least the free ends of said clamping band means are provided with arched surface means, as viewed in transverse cross section through the band means, to provide outwardly extending, groove-like reinforcing embossments, and in that at least one end of said band means is of tapered configuration, as viewed in the circumferential direction thereof, with the tapering side surfaces converging toward each other in the direction toward the respective band end so that the arched surface means of said one band end are able to engage in overlying arched surface means near the other band end to assure thereby a continuously smooth, stepless internal configuration of the band means during tightening thereof by contraction of the ear means as the diametric dimension is reduced.

2. A clamp structure according to claim 1, characterized in that the arched surface means are located substantially centrally in the band means as viewed in transverse cross section and are adjoined on each side thereof by flat object-engaging band surfaces.

3. A clamp structure according to claim 2, characterized in that the ear means includes outwardly extending leg portions connected by a bridging portion.

4. A clamp structure according to claim 3, characterized in that said bridging portion is provided with a reinforcing groove extending generally in the circumferential direction.

5. A clamp structure according to claim 3 or 4, characterized in that the portions of said ear means are also of arched configuration, as viewed in transverse cross section.

6. A clamp structure according to claim 5, characterized in that an opening is provided in the area of each transition from a corresponding band portion into the adjoining leg portion of the ear means.

7. A clamp structure according to claim 2, characterized in that each end of the band means is tapered in the circumferential direction and is provided with an arched surface means extending at least a predetermined distance in the circumferential direction from the respective free band end.

8. A clamp structure according to claim 7, characterized in that the tapering side surfaces of a respective band end pass over into a rounded-off free end with the width of the band at the point of transition from the side surfaces into the rounded-off free end being smaller than the width of the arched surface means as viewed in transverse cross section.

9. A clamp structure according to claim 7 or 8, characterized in that the connecting means is a form-locking connecting means including hook means extending inwardly from the arched surface means of a band portion and engaging in openings provided in the arched surface means of the underlying band portion, the arched surface means extendigng also into the area of a band portion of the band means provided with said openings.

10. A clamp structure according to claim 1, characterized in that the ear means is provided in a bridge member separate from said band means, said bridge member also including circumferentially extending band portions adjoining the ear means on each side thereof in the circumferential direction, each of the band portions of the bridge member being provided with inwardly extending hook means engaging in openings provided in arched surface means near each end of the band means so that the clamping structure is assembled by engagement of the hook means in respective openings and is adapted to be tightened about the object to be fastened by contraction of the ear means.

11. A clamp structure according to claim 10, characterized in that each end of the band means is tapered in the circumferential direction and is provided with centrally disposed arched surface means extending from the tapered end thereof to at least a predetermined distance in the direction toward the center of the band means beyond the last opening.

12. A clamp structure according to claim 11, characterized in that the remaining part of the band means is relatively flat as viewed in transverse cross section.

13. A clamp structure according to claim 12, characterized in that only those parts of the band means having arched surface means are pre-bent to the approximate radius of curvature of the object to be fastened.

14. A clamp structure according to claim 11, characterized in that the band means is provided with an arched portion over its entire length thereof.

15. A clamp structure according to claim 11, 12, 13 or 14, characterized in that each band end is provided with a number of openings greater than the number of hook means so that the clamp structure can be utilized for more than one size of diameter.

16. A clamp structure according to claim 9, characterized in that the ear means is unitary with the band means and is located a predetermined distance from one end of the band means, said one end being provided near its end with the hook means engaging into openings provided in the arched surface means of the underlying portion of the band means, the arched surface means being provided in the band means at least within the area thereof adjoining the ear means in a direction opposite said one end over a predetermined distance in the circumferential direction toward the band center as well as also within the area of the other band end a predetermined distance toward the band center, at least said other band end being also tapered in the circumferential direction, and said openings being provided a predetermined distance from said other band end.

17. A clamp structure according to claim 16, characterized in that the band means is provided within the area of each band end with arched surface means.

18. A clamp structure according to claim 17, characterized in that said one band end forms the outer band portion overlying said other band end which extends across the gap formed underneath the ear means.

19. A clamp structure according to claim 10 or 11, characterized in that auxiliary holding means are provided for holding the bridge member with the hooks on one side thereof engaging in the openings of one band end.

20. A clamp structure according to claim 19, characterized in that the auxiliary holding means includes a holding clamp.

21. A clamp structure according to claim 20, characterized in that the holding clamp forming the auxiliary holding means is of generally rectangular configuration as viewed in transverse cross section, and includes two side portions connected by an outer bridging portion having centrally arched surface means and inwardly disposed relatively short leg portions extending at approximately right angle from the side portions toward each other.

22. A clamp structure according to claim 21, characterized in that the length of said leg portions is at most equal to the flat, object-engaging surfaces of the band means and said side portions have a length slightly greater than the thickness of an end portion of the band means plus the thickness of a band portion of the bridge member.

23. A clamp structure according to claim 22, characterized in that the bridging portion is provided with indexing indentations to hold the holding clamp in proper position relative to openings formed by the punched-out hook means.

24. A clamp structure according to claim 19, characterized in that the auxiliary holding means is an assembling tool.

25. A tool for assembling a clamp structure according to claim 10 or 24, characterized in that the tool includes a handle part and a clamp-engaging part, the clamp-engaging part being provided with a rectangularly shaped channel open at the outer surface thereof and forming inwardly thereof a band-engaging surface provided with a centrally disposed recess portion of a shape at least approximately complementary to the arched surface means and adjoined on each side thereof by a flat surface portion, the total width of the band-engaging surface being slightly larger than the width of the band means and being formed at the outer end by undercuts, and two flexible holding members secured along the sides of the handle portion which are parallel to the direction of the channel, said holding members being provided with leg portions extending over the outer end of the tool and projecting into the center area of the rectangular channel at right angle thereto.

26. A tool for assembling a clamp structure according to claim 25, characterized in that free ends of the leg portions of the holding members are bevelled conically toward each other.

27. A tool for assembling a clamp structure according to claim 26, characterized in that the undercuts are of approximately conical configuration in cross section.

28. A tool for assembling a clamp structure according to claim 27, characterized in that the rectangular tool part is bevelled in the direction toward the recess portion.

29. A tool for assembling a clamp structure according to claim 28, characterized in that the holding members are fastened near their inner end to the handle portion in such a manner that the leg portions thereof can be spread apart elastically.

30. A clamp structure according to claim 1, 10, 11, 12, 13 or 14, characterized in that the clamping band means has relatively flat, object-engaging surface means over at least nearly its object-engaging circumferential extent.

31. A clamp structure according to claim 30, characterized in that within the area of an arched surface means, said relatively flat object-engaging surface means are located on both sides of a respective arched surface means, as viewed in the axial direction.

32. A clamp structure according to claim 30, characterized in that a respective arched surface means is located at least approximately centrally in the band means, as viewed in the width direction thereof, and, at least within the non-tapering area of the band means, is adjoined on each side thereof by object-engaging surface means.

33. A clamp structure according to claim 1 or 8, characterized in that the tapering side surfaces pass over into an end portion short of the intersection of the tapering side surfaces in such a manner and at such a distance from the intersection that the width of the band means at the point of transition into the end portion is between about one-third to about two-thirds the width of the arched surface means.

34. A clamp structure according to claim 33, characterized in that the clamping band means has relatively flat, object-engaging surface means over at least nearly its object-engaging circumferential extent.

* * * * *